US005207358A

United States Patent [19]

Bisker

[11] Patent Number: 5,207,358

[45] Date of Patent: May 4, 1993

[54] ISOLATION APPARATUS FOR A DISPENSER DELIVERY SYSTEM

[75] Inventor: Richard G. Bisker, Salisbury, Md.

[73] Assignee: Dresser Industries, Inc., Dallas, Tex.

[21] Appl. No.: 677,920

[22] Filed: Apr. 1, 1991

[51] Int. Cl.[5] ........ B01D 27/10

[52] U.S. Cl. ........ 222/189; 222/563; 210/234; 210/418

[58] Field of Search ........ 222/548, 549, 551, 552, 222/554, 562, 563, 71, 72, 73, 189; 210/232, 234, 418, 429, 430

[56] References Cited

U.S. PATENT DOCUMENTS

| | | | |
|---|---|---|---|
| 2,680,538 | 6/1954 | Fishburn | 222/189 X |
| 2,794,573 | 6/1957 | Moore et al. | 222/189 X |
| 2,936,099 | 5/1960 | Smith | 222/189 |
| 2,955,712 | 10/1960 | Gutkowski | 210/234 |
| 3,113,700 | 12/1963 | Chaffee et al. | 222/189 X |
| 3,159,310 | 12/1964 | Rafferty | 222/189 X |
| 3,169,667 | 2/1965 | Headrick | 222/189 X |
| 3,291,342 | 12/1966 | Mankin | 222/189 X |
| 3,300,050 | 1/1967 | Perry | 210/234 |
| 3,866,798 | 2/1975 | Marsh | 222/52 |
| 4,082,673 | 4/1978 | Cilento | 210/234 |
| 4,332,276 | 6/1982 | Spring | 222/562 X |
| 4,529,514 | 7/1985 | Gruett | 210/234 |
| 4,529,515 | 7/1985 | Selz | 210/234 |
| 4,550,896 | 11/1985 | Hansen, III | 210/418 X |
| 4,588,504 | 5/1986 | Berges et al. | 210/234 |
| 4,818,397 | 4/1989 | Joy | 210/232 |

FOREIGN PATENT DOCUMENTS

| | | | |
|---|---|---|---|
| 1174640 | 7/1964 | Fed. Rep. of Germany | 210/234 |

*Primary Examiner*—Andres Kashnikow
*Assistant Examiner*—Kenneth DeRosa
*Attorney, Agent, or Firm*—Jones, Day, Reavis & Pogue

[57] ABSTRACT

An apparatus for isolating an underground piping system from dispensers having a filter assembly. The isolation apparatus includes a seal member and a securing member which replace an in-line filter assembly. The seal member has a similar cross-sectional shape of the filter with a pair of inner and outer seals. The securing member is receivable on a nipple adapter that the filter assembly was received on and abuts the back portion of the seal member to engage the seals against an outlet conduit of the underground piping system.

6 Claims, 2 Drawing Sheets

Fig.1
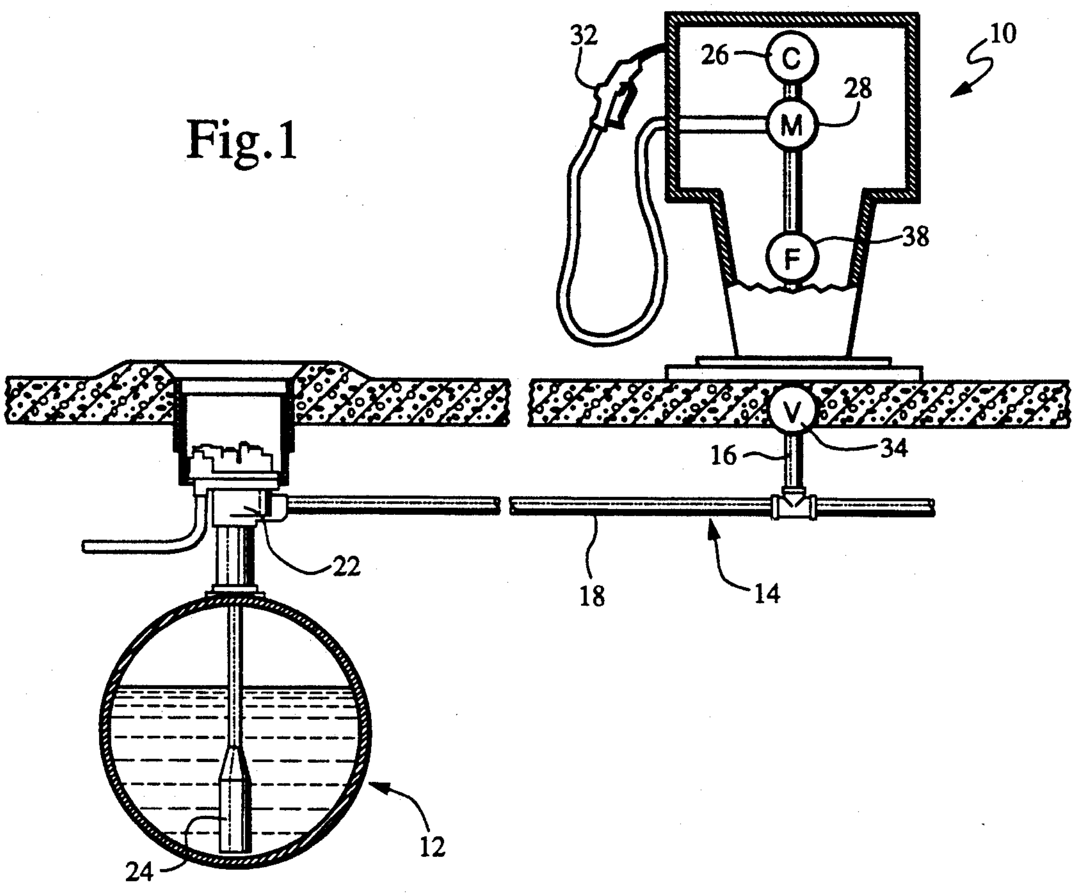
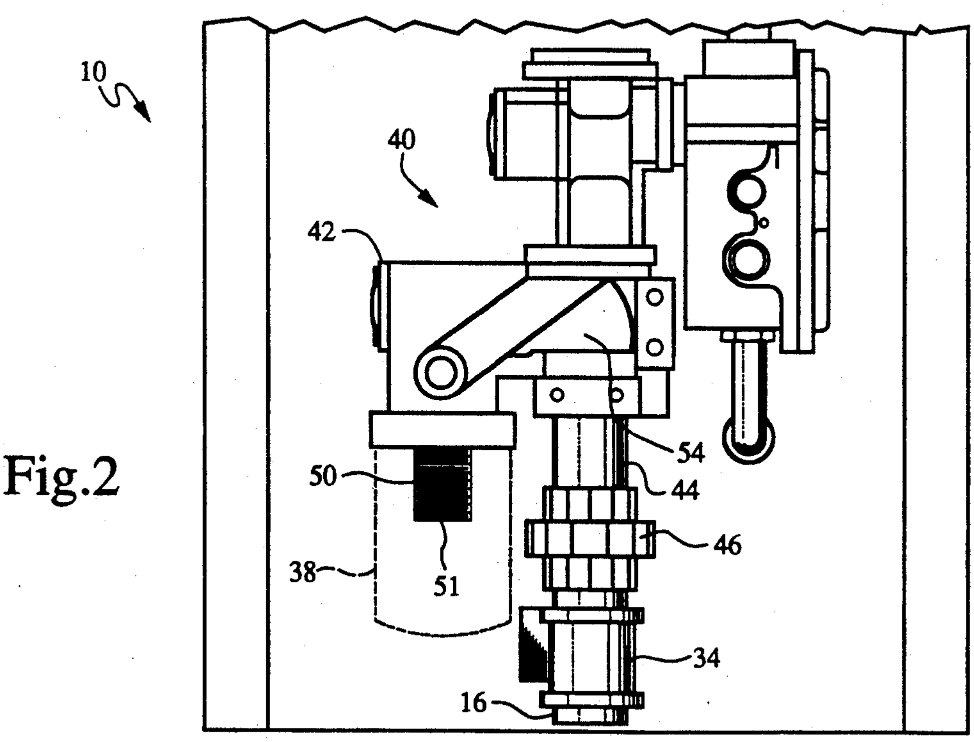
Fig.2

ISOLATION APPARATUS FOR A DISPENSER DELIVERY SYSTEM

FIELD OF INVENTION

This invention relates to an apparatus for isolating a dispenser from an underground piping system, and more particularly from an underground fuel piping system.

BACKGROUND OF THE INVENTION

Dispensers are a convenient way for providing fluid from a remote underground reservoir to a number of fluid containers. In particular, fuel dispensers provide fuel to transportation vehicles from an underground storage reservoir. In order to refuel the vehicle, the vehicle must be parked in close proximity to the fuel dispenser. This may result in the fuel dispenser being accidentally knocked over or hit by the vehicle.

For such cases, current fuel dispenser designs include an impact valve that close off the fuel flow from the fuel reservoir to the internal dispenser hydraulic plumbing. This impact valve prevents mass fuel flow from spilling onto the ground floor and allows an operator enough time to shut off the fuel delivery pump. But it should be noted that impact valves generally fail to completely seal the internal dispenser hydraulic plumbing from the underground piping system when the system is pressure tested for leaks.

Government regulations mandate periodic checks of the underground piping system for leaks, thereby requiring that the fuel dispensers be isolated. One method of isolation of the fuel dispenser includes the closure of the impact/emergency valve to isolate each fuel dispenser from the underground piping system. This method is inadequate because the pressure from the fuel delivery pump causes leaks to occur past the impact valves.

Another method requires that the fuel delivery pump be shut off, so that the internal dispenser hydraulic plumbing can be disconnected from the underground reservoir. The fuel dispenser is then tipped so that the conduit leading to the underground piping system can be capped off. This method may result in damage to the dispenser as well as being costly, time consuming and awkward.

SUMMARY OF THE INVENTION

In accordance with the present invention, the drawbacks of the previous methods are addressed by an apparatus that completely isolates a fuel dispenser from a pressurized underground piping system. The isolation apparatus replaces a filter assembly of the fuel dispenser and includes a seal member for blocking an outlet conduit of the underground piping system and a securing member for holding the seal member in sealing engagement with the outlet conduit. A pair of seals are located on the face portion of the seal member, the first seal received in an inner groove and the second seal received in an outer groove. The seal member is preferably cylindrical and of the same diameter as the replaced filter. The securing member which may be integral with the sealing member, includes complementary threads for receiving a threaded inlet conduit of the fuel dispenser.

Accordingly, it is an object of this invention to provide an isolation apparatus that effectively seals and isolates the underground piping system from the fuel dispenser.

It is a feature of this invention to have a seal member and securing member that can replace an existing filter assembly.

It is an advantage of this invention to have an isolation apparatus that is easy to manually set up and use and of relatively simple and economic design, manufacture and assembly.

Other objects, features and advantages of the invention will be apparent in the following description and claims in which the invention is described, together with details to enable persons skilled in the art to practice the invention, all in connection with the best mode presently contemplated for the invention.

BRIEF DESCRIPTION OF THE DRAWINGS

Drawings accompanying the disclosure and the various views thereof may be briefly described as:

FIG. 1 is a schematic diagram illustrating a fuel dispenser delivery system;

FIG. 2 is a fragmentary side elevational view of a fuel dispenser of the fuel dispenser delivery system of FIG. 1;

DETAILED DESCRIPTION OF THE INVENTION

Figure 3:
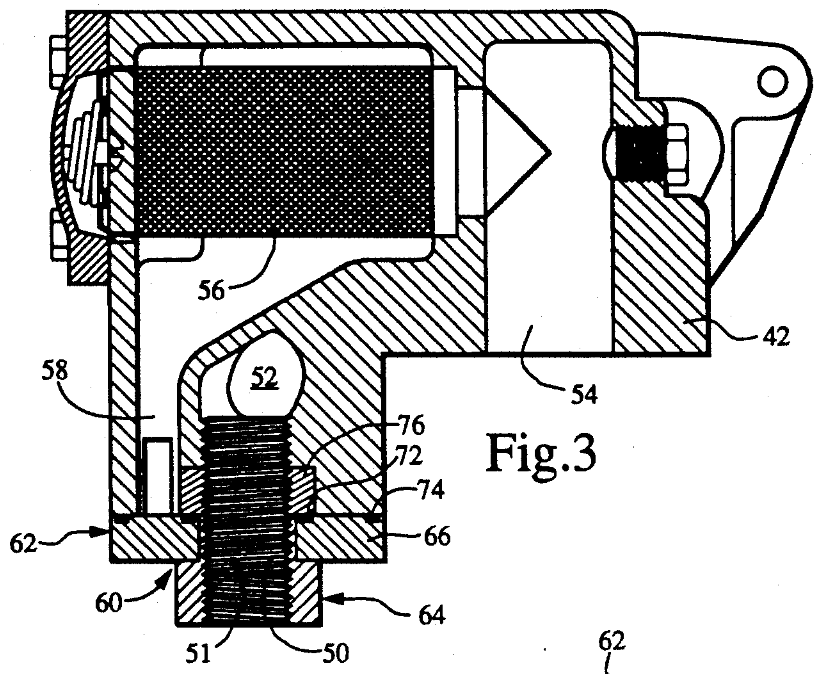
FIG. 3 is an enlarged view of the fuel dispenser of FIG. 2 including an isolation apparatus of the present invention.

The preferred embodiment of the present invention is illustrated by way of example in FIGS. 1–8. With specific reference to FIG. 1, a fuel dispenser delivery system includes a fuel dispenser 10 that is connected to a fuel reservoir 12 through an underground piping system 14. The underground piping system 14 has a dispenser conduit 16 connected to a fuel conduit 18 that extends to a pump head 22. A submersible pump 24 disposed in the fuel reservoir 12 is in fluid communication with the pump head 22.

The fuel dispenser 10 has a counter device 26 that generally indicates a total number of gallons of fuel dispensed, as well as the price of the fuel dispensed. A meter 28 measures the fuel flow from the fuel reservoir 12 to a dispensing hose and nozzle assembly 32, and registers such measurements into the counter device 26. A valve 34 is placed upstream from the fuel reservoir 12 just before the fuel dispenser 10 to cut off fuel flow. The valve 34 is an impact type that may be manually opened or closed or automatically closed if the fuel dispenser 10 is accidentally hit or impacted by a vehicle.

Generally upstream from this valve 34 is a filter assembly 38 which removes any impurities that the fuel has accumulated while in the reservoir 12 or as it travels through the underground piping system 14. As shown in FIG. 1, the fuel dispenser 10 is in a schematic form and may be arranged in many similar ways as described.

As shown in detail in FIG. 2, the fuel dispenser 10 has an internal hydraulic plumbing 40 that is connected to the impact valve 34. The internal plumbing 40 includes a strainer assembly 42 that is connected to a nipple 44 and joined by union 46 to the impact valve 34 which is connected to the inlet 16 from the underground piping system 14. On the outlet portion of the strainer assembly 42 is a filter assembly 38. The filter assembly 38 is joined to the strainer assembly 42 by threading onto a nipple adapter 50 having external threads 51 to receive the filter assembly 38. The nipple adapter 50 is received in a dispenser inlet passage 52 formed within the strainer assembly 42 (See FIG. 3).

In normal operation, fuel is delivered through dispenser conduit 16 into an inlet 54 of the strainer assembly 42 and out through the dispenser inlet 52 to the hose and nozzle assembly 32. As shown in detail in FIG. 3, the fuel passes through a strainer 56 into an outlet portion 58 of the strainer assembly 42. For further purification, the fuel passes through the filter assembly 38 before entering the dispenser inlet 52.

To periodically check the underground piping system 14 for leaks, the dispenser 10 must be isolated from underground piping system 14. An isolation apparatus 60 of this invention shown in FIGS. 4–8 provides effective blockage of the pressurized piping system 14. The isolation apparatus 60 includes a seal member 62 and a securing member 64, preferably an internally threaded nut. Alternatively, this securing member 64 may be manufactured integral with seal member 62.

Figure 4:
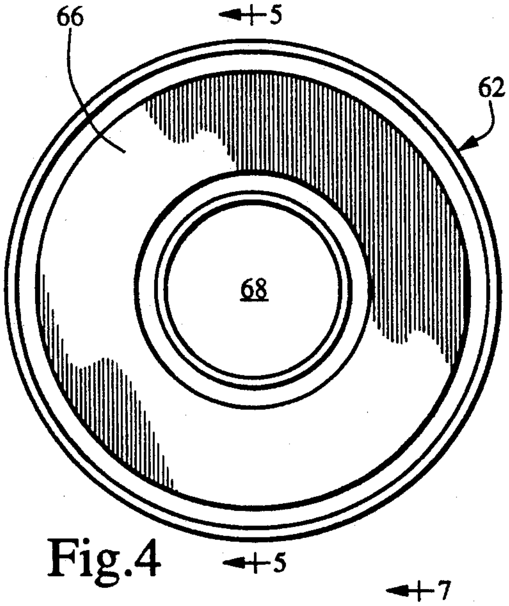
FIG. 4 is a top plan view of a seal member of the isolation apparatus of the present invention.
Figure 5:
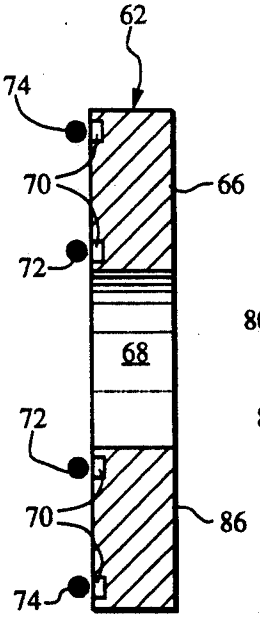
FIG. 5 is a sectional view of the seal member along line 5—5.
Figure 8:
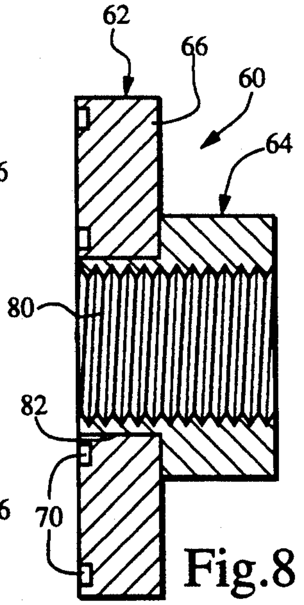
FIG. 8 is a cross sectional view of the isolation apparatus of this invention.

Seal member 62 is constructed and arranged to effectively seal the outlet portion 58 of the strainer assembly 42, and is preferably the same cross-sectional shape as that of the filter assembly 38. In FIG. 4, the seal member 62 is shown as a cylindrical body 66 having a centrally located opening 68 for receiving nipple adapter 50. On the top portion of body 66 is a pair of grooves 70 for receiving a pair of seals, preferably sealing rings 72, 74. Inner sealing ring 72 is adjacent to and encircles the nipple adapter 50, and outer sealing ring 74 is positioned on the periphery of cylindrical body 66 for sealing against strainer assembly 42. In certain embodiments of strainer assembly 42, a spacer 76 is needed to effectively seal around the nipple adapter 50 (See FIG. 3).

Figure 6:
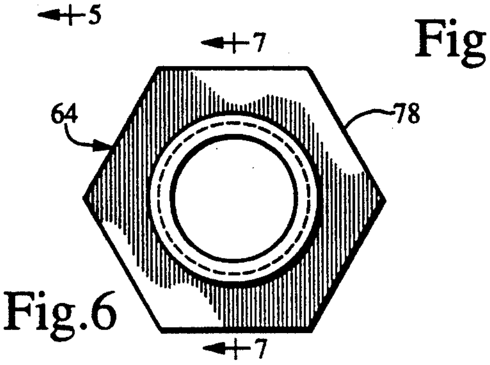
FIG. 6 is a top plan view of a securing member of the isolation apparatus of this invention.
Figure 7:
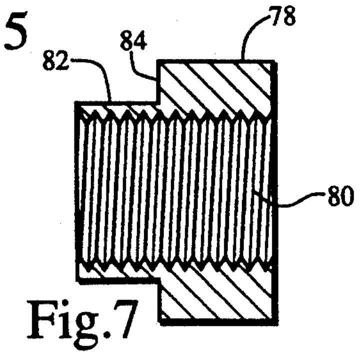
FIG. 7 is a sectional view of the securing member along line 7—7.

Securing nut 64 is shown in FIG. 6 as having several sides or "wrench flats" 78 to permit a tool to grasp the nut 64 for tightening or loosening. The tool can tightly secure nut 64 to the nipple adapter 50 and force the sealing rings 72, 74 into engagement with strainer assembly 42 and/or spacer 76. As shown in FIG. 7, the securing nut 64 has internally threaded opening 80 for engaging the nipple adapter 50 and has a smaller diameter forward portion 82 receivable in the opening 68 of the body 66.

When the underground piping system 14 needs to be checked for leaks, the submersible pump 24 and the pump head 22 are turned off, so that filter assembly 38 can be removed from nipple adapter 50. Depending on strainer assembly 42 configuration, the spacer 76 may be placed around nipple adapter 50 for effective sealing. Seal member body 66 is then placed against the outlet portion 58 of the strainer assembly 42 with the sealing rings 72 and 74 located in the grooves 70 to engage the strainer assembly body. Securing nut 64 is then threaded onto the nipple adapter 50 and is received through the opening 68 and has a shoulder 84 abutting against the back 86 of the cylinder body 66 to hold seals 72 and 74 in sealing engagement. Submersible pump 24 and pump head 22 may then be turned on to pressurize the underground piping system 14 to check for underground leaking. Isolation apparatus 60 has been constructed and designed to withstand the pressures from the pump 24 without leaking and thereby causing a safety hazard.

It is to be understood that the terminology as employed in the description and claims incorporated herein is used by way of description and not by way of limitation, to facilitate understanding of the structure, function and operation of the combination of elements which constitute the present invention. Moreover, while the foregoing description and drawings illustrate in detail one successful working embodiment of the invention, to those skilled in the art to which the present invention relates, the present disclosure will suggest many modifications in the construction, as well as widely differing embodiments in applications without thereby departing from the spirit and scope of the invention. The present invention, therefore, is intended to be limited only by the scope of the appended claims and applicable prior art.

What we claim is:

1. An apparatus for isolating fuel from a fuel dispenser of a fuel dispensing system having a fuel reservoir; pump means disposed in communication with said reservoir for pumping fuel out of said reservoir; a fuel dispenser located remote from said reservoir, including fuel delivery means; conduit means connecting said pump means and delivery means in fluid communication; a filter assembly connected to said conduit means between said fuel reservoir and said fuel dispenser, wherein said conduit means is constructed and arranged so that fuel from said fuel reservoir enters an outlet, passes through said filter assembly before exiting through an inlet to said delivery means, the isolation apparatus comprises:

A. a seal member having a first seal and a second seal on a top portion of said seal member for replacing said filter assembly to block said inlet to said delivery means; and B. means for securing said seal member to said inlet of said dispenser.

2. The isolation apparatus as set forth in claim 1 wherein said seal member further comprises first and second grooves on the top portion, each groove receiving said respective seal.

3. The isolation apparatus as set forth in claim 2 wherein said seal member has a cylindrical body with a central opening such that said first seal and first groove proximately encircle said central opening and said second seal and said second groove are positioned on the peripheral edge of the top portion of said cylindrical body.

4. The isolation apparatus as set forth in claim 3 wherein said securing means comprises a nut receivable on said inlet having a forward portion end receivable in said central opening of said cylindrical body and a shoulder on the other end of said nut to contact a back face of said cylindrical body.

5. The isolation apparatus as set forth in claim 3 wherein said inlet to said delivery means includes an externally threaded nipple adapter.

6. The isolation apparatus as set forth in claim 5 wherein a nut having a centrally located internally threaded opening is receivable on said externally threaded nipple adapter.

* * * * *